United States Patent [19]

Sato et al.

[11] Patent Number: 4,730,031

[45] Date of Patent: Mar. 8, 1988

[54] POLYMERS OF SUBSTITUTED 1,3-BUTADIENE COMPOUNDS HAVING REACTIVE SILYL GROUPS AND PROCESS FOR THEIR PREPARATION

[75] Inventors: Fumie Sato, Fujisawa; Seiichi Nakahama, Yokohama; Akira Hirao, Kawasaki; Misao Miyamoto; Kenichi Osawa, both of Ichihara; Toshihiro Ishii, Tokyo, all of Japan

[73] Assignee: Nissan Chemical Industries Ltd., Tokyo, Japan

[21] Appl. No.: 824,581

[22] Filed: Jan. 23, 1986

[30] Foreign Application Priority Data

Jan. 23, 1985 [JP] Japan ................................. 60-10307
Jan. 23, 1985 [JP] Japan ................................. 60-10308
May 24, 1985 [JP] Japan ................................. 60-111937

[51] Int. Cl.$^4$ .................. C08F 130/08; C08F 230/08; C08F 4/46
[52] U.S. Cl. ..................................... 526/279; 526/173
[58] Field of Search .......................................... 526/279

[56] References Cited

U.S. PATENT DOCUMENTS 2,532,583 12/1950 Tyran et al. ........................ 526/279

FOREIGN PATENT DOCUMENTS 60-90205  5/1985 Japan ................................. 526/279
60-212757 10/1985 Japan ................................. 526/279

OTHER PUBLICATIONS

Makarov et al.,—Vysokomolek, SOED (USSR), vol. 13, No. 8, (1971), pp. 1857–1862.
Chem. Abstracts—vol. 74, entry 142643 P, Makarov et al.
Polymer Science USSR, vol. 13, No. 8, K. A. Makarov et al., "The polymerization of 1-triethylsilylbutadiene-1,3 and its copolymerization with styrene"; pp. 2085–2091, 1971.
Chemical Abstracts, vol. 95, No. 7, 8/17/81, p. 741, No. 62398f & SU-A 791, 754, Chernyshev et al.

Primary Examiner—Edward J. Smith
Assistant Examiner—Peter F. Kulkosky
Attorney, Agent, or Firm—Oblon, Fisher, Spivak, McClelland & Maier

[57] ABSTRACT

A polymer obtained by the polymerization of a substituted 1,3-butadiene compound of the formula:

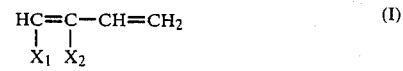

wherein each of $X_1$ and $X_2$ is hydrogen or $SiR_1R_2R_3$, provided that at least one of $X_1$ and $X_2$ is $SiR_1R_2R_3$, wherein each of $R_1$, $R_2$ and $R_3$ is halogen, lower alkyl or lower alkoxy, provided that $R_1$, $R_2$ and $R_3$ are not lower alkyl at the same time.

6 Claims, No Drawings

POLYMERS OF SUBSTITUTED 1,3-BUTADIENE COMPOUNDS HAVING REACTIVE SILYL GROUPS AND PROCESS FOR THEIR PREPARATION

The present invention relates to novel polymers obtained by the polymerization of substituted 1,3-butadiene compounds, and a process for their preparation. More particularly, the present invention relates to polydienes having reactive silyl groups and a process for their preparation. Conventional reactive silane compounds are, in many cases, intended for surface treatment of inorganic substances, and they are, in most cases, low molecular weight compounds. Further, polymerizable silane compounds such as vinyl compounds or methacrylate compounds having reactive silyl groups are known. However, such polymerizable silane compounds are intended for use in a small amount for the copolymerization with other plastic materials, and they have not usually used alone for polymerization.

The present inventors have found that polymers having reactive silyl groups and carbon-carbon double bonds which are not found in the conventional silane compounds, can be used for various applications. The present invention is based on this discovery.

The present invention provides a polymer obtained by the polymerization of a substituted 1,3-butadiene compound of the formula:

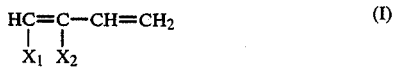

$$HC=C-CH=CH_2 \qquad (I)$$
$$\phantom{HC=C}|\phantom{-CH=}|$$
$$\phantom{HC=C}X_1\phantom{-C}X_2$$

wherein each of $X_1$ and $X_2$ is hydrogen or $SiR_1R_2R_3$, provided that at least one of $X_1$ and $X_2$ is $SiR_1R_2R_3$, wherein each of $R_1$, $R_2$ and $R_3$ is halogen, lower alkyl or lower alkoxy, provided that $R_1$, $R_2$ and $R_3$ are not lower alkyl at the same time.

Most of the polymer structure of the present invention has a unit of the formula:

$$+C-C=C-C+ \qquad (II)$$
$$\phantom{+C}|\phantom{-C=C-}|$$
$$\phantom{+C}X_1\phantom{-C=C}X_2$$

wherein $X_1$ and $X_2$ are as defined above.

Now, the present invention will be described in detail with reference to the preferred embodiments.

By virtue of the reactive silyl groups and carbon-carbon double bonds, the homopolymer of the present invention is useful for an improvement of the impact resistance of plastics by imparting rubber elasticity to the surface of an inorganic filler, for the production of highly oriented magnetic substance by imparting rubber elasticity to the surface of magnetic substance, and for blending with a rubber, followed by co-vulcanization, or it is useful for the cross-linking by means of the reactive silyl groups, for an improvement of the hydrolysis resistance of e.g. FRP (fiber reinforced plastics) by the treatment of the surface of an inorganic filler and for applications to e.g. adhesives for glass, ceramics or rubber products. Further, it may be used for various other purposes.

In some cases, the monomer of the substituted 1,3-butadiene compound may be added to the above material, and then polymerized.

The copolymer of the present invention is likewise useful for an improvement of the heat resistance of plastics, for adhesives for glass, ceramics or rubber products, and for coupling agents, since it is readily crosslinkable by virtue of the reactive silyl groups and carbon-carbon double bonds, and it is further useful for various other applications.

The homopolymers and copolymers of the present invention may further be useful as anionic polymeric initiators to produce polymers having affinity with inorganic substances.

Among them, living polymers are particularly useful as anionic polymeric initiators, for instance, for the preparation of living block copolymers.

The polymers obtainable by these living polymers are useful for an improvement of the impact resistance of plastics by imparting rubber elasticity to the surface of inorganic fillers, for the production of highly dispersible magnetic material by coating the surface of the magnetic substance, and for blending with rubber, followed by co-vulcanization, by virtue of the reactive silyl groups and carbon-carbon double bonds. Further, they are useful for cross linking by means of the reactive silyl groups, for an improvement of the hydrolysis resistance of e.g. FRP by the treatment of the surface of inorganic fillers, and for adhesives for glass, ceramics or rubber products. They are further useful for various other applications such as for UV photo-resists.

Further, the living homopolymers of the present invention are useful as starting materials for living block copolymers with other unsaturated monomers such as styrene, α-methylstyrene, 1,3-butadiene, isoprene, methyl acrylate, methyl methacrylate, acrylonitrile and methacrylonitrile, and for block copolymers obtained therefrom. They are useful as compatibility improvers for a blend with other polymers, for medical purposes by virtue of the microphase separation structures, and as impact resistance improvers.

The novel polydiene having reactive silyl groups of the present invention are obtained by subjecting the substituted 1,3-butadiene compound of the formula I to homopolymerization or to copolymerization with an unsaturated monomer.

The substituted 1,3-butadiene compound to be used for the polymerization of the present invention includes 1-trimethoxysilyl-1,3-butadiene, 1-triethoxysilyl-1,3-butadiene, 1-triisopropoxysilyl-1,3-butadiene, 1-tri-n-propoxysilyl-1,3-butadiene, 1-methoxydimethylsilyl-1,3-butadiene, 1-dimethoxymethylsilyl-1,3-butadiene, 1-trichlorosilyl-1,3-butadiene and 1-dimethylchlorosilyl-1,3-butadiene.

Further, 2-trimethoxysilyl-1,3-butadiene, 2-triethoxysilyl-1,3-butadiene, 2-triisopropoxysilyl-1,3-butadiene, 2-tri-n-propoxysilyl-1,3-butadiene, 2-methoxydimethylsilyl-1,3-butadiene, 2-dimethoxymethylsilyl-1,3-butadiene, 2-trichlorosilyl-1,3-butadiene and 2-dimethylchlorosilyl-1,3-butadiene may also be employed.

Further, the novel copolymers having reactive silyl groups and carbon-carbon double bonds of the present invention can be obtained also by copolymerizing the substituted 1,3-butadiene compound of the formula I with one or more unsaturated monomers.

Such unsaturated monomers to be used in the present invention include unsaturated hydrocarbons such as ethylene, propylene, acetylene, styrene and α-methylstyrene, vinyl compounds such as vinyl acetate, vinyl chloride, acrylonitrile and methacrylonitrile, acrylic or methacrylic esters such as ethyl acrylate, 2-ethylhexyl acrylate, methyl methacrylate and n-butyl methacrylate, diene compounds such as isoprene, chloroprene and butadiene, maleic acid derivatives such as maleic anhydride and di-2-ethylhexyl maleate, and unsaturated carboxylic acids such as acrylic acid, methacrylic acid and itaconic acid.

There is no particular restriction as to the molecular weights of the homopolymers and copolymers of the present invention, which may be polymers or oligomers. Likewise, there is no particular restriction as to the proportions of the copolymer constituents.

Any of radical polymerization, cationic polymerization and anionic polymerization may be employed for the process for the preparation of the polymer of the present invention.

The radical polymerization may be initiated by application of high temperature heating and radiation or by means of an initiator. The initiator includes an azo initiator such as 2,2′-azobisisobutyronitrile, a peroxide initiator such as benzoylperoxide, and a redox initiator composed of a combination of benzoylperoxide and N,N-dimethylaniline.

As initiators for the cationic polymerization, Lewis acid initiators such as aluminum chloride, boron trifluoride and dichloromonoethylaluminum may be mentioned.

As initiators for the anionic polymerization, alkyl metals such as naphthalene sodium and n-butyl lithium, and Ziegler type catalysts may be mentioned.

In particular, the living polymerization initiators for the present invention include lithium naphthalide, sodium naphthalide, potassium naphthalide, oligo-α-methylstyryl lithium, oligo-α-methylstyryl sodium, oligo-α-methylstyryl potassium, cumyl potassium and n-butyl lithium.

However, by mere high temperature heating, the degree of polymerization of the homopolymer was rather low. Further, with an initiator having a low activity such as 2,2-azobisisobutyronitrile, the yield of a copolymer with a maleic acid derivative was rather low.

The above polymerization reactions may be conducted by directly adding the initiator to the substituted 1,3-butadiene compound or to a mixture of the substituted 1,3-butadiene compound with an unsaturated monomer, or may be conducted in a solvent which does not adversely affect the polymerization reaction.

With respect to such a solvent, the radical polymerization may be conducted in a solvent which is commonly used in a usual solution polymerization, such as toluene or ethyl acetate, and the cationic polymerization may preferably conducted in a halogenated hydrocarbon such as carbon tetrachloride, chloroform or methylene chloride.

Further, for the anionic polymerization, benzene, toluene, hexane, cyclohexane, preferably ether-type solvent such as tetrahydrofuran or dioxane may be used.

The radical polymerization is conducted at a temperature of from $-100°$ to $100°$ C., from 1 to 100 hours, preferably in the presence of a solvent.

The cationic polymerization is conducted at a low temperature of from $-100°$ C. to room temperature, for 1 to 100 hours, preferably in the presence of a solvent.

The anionic polymerization is conducted at a low temperature of from $-100°$ C. to room temperature, for from 0.1 to 100 hours, preferably in the presence of a solvent. The anionic polymerization reaction is conducted in an inert gas atmosphere in the absence of moisture or oxygen which adversely affects the polymerization reaction.

The weight-average molecular weight of the polymers obtained by radical polymerization was from about 500 to about 2,000,000.

The weight-average molecular weight of the polymers obtained by the cationic polymerization was from about 500 to about 10,000.

Likewise, the weight-average molecular weight of the polymers obtained by the anionic polymerization was from about 500 to about 500,000.

The molecular weight of a living polymer can be controlled by adjusting the ratio of the substituted 1,3-butadiene compound to the anionic polymerization initiator. Namely, it is possible to increase the molecular weight by increasing the ratio.

The living polymers thus obtained usually have a weight-average molecular weight of from about 500 to about 500,000, preferably from about 2,000 to about 200,000, more preferably from about 5,000 to about 100,000, in view of the physical properties of the polymers obtainable from the living polymers.

The living polymers and the polymers obtainable from the living polymers, are polymers having extremely narrow molecular weight distribution with the ratio of the weight-average molecular weight to the number-average molecular weight being close to 1.

Now, the present invention will be described in further detail with reference to Examples. However, it should be understood that the present invention is by no means restricted to these specific Examples.

EXAMPLE 1

Into a glass ampoule, 5.22 g ($3 \times 10^{-2}$ mol) of distilled 2-trimethoxysilyl-1,3-butadiene and 0.03 g ($1.8 \times 10^{-4}$ mol) of azoisobutyronitrile were introduced, and the ampoule was sealed and immersed in a constant-temperature water bath of 60° C., whereupon the reaction was conducted for 10 hours.

After the reaction, the reaction mixture was taken out from the ampoule and subjected to vacuum drying to obtain a polymer.

The polymer thus obtained was dissolved in tetrahydrofuran and subjected to gel permeation chromatography for the measurement of the molecular weight, whereby the weight-average molecular weight was found to be 5,200.

Further, the glass transition temperature was measured by differential scanning calorimeter (DSC) at a rate of heating of 10° C./min, whereby it was found to be $-43°$ C.

EXAMPLE 2

300 g (1.72 mol) of 2-trimethoxysilyl-1,3-butadiene and 6 g ($2.0 \times 10^{-2}$ mol) of 1,1-di-t-butylperoxy-3,3,5-trimethylcyclohexane (Trigonox 29, manufactured by Kayaku Noury K.K.) were charged into a flask, and the flask was dipped in a constant-temperature water bath of 105° C., whereby the reaction was conducted for 2.5 hours. The rest of treatment was conducted in the same manner as in Example 1.

The yield of the polymer obtained was 80%, and the weight-average molecular weight was 129,000.

The microstructure of this poly(2-trimethoxysilyl-1,3-butadiene) was a 1,4-addition type and was composed of 70% of the cis-form and 30% of the trans-form. The glass transition temperature was $-43°$ C.

EXAMPLE 3

100 g ($5.75 \times 10^{-1}$ mol) of 2-trimethoxysilyl-1,3butadiene and 2 g ($1.25 \times 10^{-2}$ mol) of t-butyl peroxy-isobutyrate (Kayaester I, manufactured by Kayaku Noury K.K.) were charged into a flask, and the flask was dipped in a constant-temperature water bath of 90° C., whereupon the reaction was conducted for 3 hours and 40 minutes. The rest of treatment was conducted in the same manner as in Example 1.

The yield of the polymer thus obtained was 85%, and the weight-average molecular weight was 32,000.

EXAMPLE 4

The polymerization reaction and treatment were conducted in the same manner as in Example 1 except that 5.22 g ($3 \times 10^{-2}$ mol) of 2-trimethoxysilyl-1,3-butadiene, 2 ml of ethyl acetate, 0.1 g ($4.1 \times 10^{-4}$ mol) of benzoyl peroxide and 0.1 g ($8.3 \times 10^{-4}$ mol) of N,N-dimethylaniline were reacted for 24 hours.

The weight-average molecular weight of the polymer thus obtained was 95,000.

The glass transition temperature was −43° C.

EXAMPLE 5

The polymerization reaction and treatment were conducted in the same manner as in Example 1 except that 5.22 g ($3 \times 10^{-2}$ mol) of 2-trimethoxysilyl-1,3-butadiene, and 0.05 g ($3.5 \times 10^4$ mol) of boron trifluoride-diethyl ether adducts were reacted for 1.6 hours.

The weight-average molecular weight of the polymer thus obtained was 2,700.

EXAMPLE 6

Into a glass ampoule, 2.61 g ($1.5 \times 10^{-2}$ mol) of distilled 2-trimethoxysilyl-1,3-butadiene, 1.50 g ($1.5 \times 10^{-2}$ mol) of methyl methacrylate and 0.1 g ($4 \times 10^{-4}$ mol) of 2,2-azobis(2,2-dimethylvaleronitrile) (V-65, manufactured by Wako Junyaku K.K.) were introduced, and the ampoule was sealed and dipped in a constant-temperature water bath of 60° C., whereupon the reaction was conducted for 24 hours.

After the reaction, the reaction mixture was taken out from the ampoule and subjected to precipitation with anhydrous methanol. The copolymer thus obtained was vacuum-dried.

The yield of the copolymer thus obtained was 82%. From the results of the elementary analysis, the copolymer was found to comprise 6.0% of silicon, 55.6% of carbon, 8.02% of hydrogen, the rest being oxygen, and the 2-trimethoxysilyl-1,3-butadiene component was about 37% by weight.

Further, the copolymer was dissolved in tetrahydrofuran and subjected to gel permeation chromatography for the measurement of the molecular weight, whereby the weight-average molecular weight was found to be 12,000.

EXAMPLE 7

The polymerization reaction and treatment were conducted in the same manner as in Example 6 except that 2.61 g ($1.5 \times 10^{-2}$ mol) of 2-trimethoxysilyl-1,3-butadiene, 1.47 g ($1.5 \times 10^{-2}$ mol) of maleic anhydride, 2 ml of ethyl acetate and 0.1 g ($6.1 \times 10^{-4}$ mol) of 2,2-azobisisobutyronitrile were reacted for 24 hours.

The yield was 7%, and the 2-trimethoxysilyl-1,3-butadiene component was about 48%.

The weight-average molecular weight of the polymer thus obtained was 55,000.

EXAMPLE 8

The reaction and treatment were conducted in the same manner as in Example 6 except that 2.61 g ($1.5 \times 10^{-2}$ mol) of 2-trimethoxysilyl-1,3-butadiene, 1.56 g ($1.5 \times 10^{-2}$ mol) of styrene, 0.1 g ($4.1 \times 10^{-4}$ mol) of benzoyl peroxide and 0.1 g ($8.3 \times 10^{-4}$ mol) of N,N-dimethylaniline were reacted at 100° C. for 10 hours.

The yield was 33%, and the 2-trimethoxysilyl-1,3butadiene component was about 19%.

The weight-average molecular weight of the polymer thus obtained was 51,000.

EXAMPLE 9

The reaction and treatment were conducted in the same manner as in Example 6 except that 2.61 g ($1.5 \times 10^{-2}$ mol) of 2-trimethoxysilyl-1,3-butadiene, 1.50 g ($1.5 \times 10^{-2}$ mol) of methyl methacrylate, 2 ml of toluene, 0.1 g ($4.1 \times 10^{-4}$ mol) of benzoyl peroxide and 0.1 g ($8.3 \times 10^{-4}$ mol) of N,N-dimethylaniline were reacted for 24 hours.

The yield was 65%, and the 2-trimethoxysilyl-1,3butadiene component was about 18%.

The weight average molecular weight of the polymer thus obtained was 73,000.

EXAMPLE 10

Anionic polymerization was conducted in the following manner by using an apparatus comprising a reaction flask connected to a highly vacuumed line and breakably sealed ampoules in which a solution mixture comprising $3.88 \times 10^{-3}$ mol of 2-triisopropoxysilyl-1,3-butadiene and 5 ml of tetrahydrofuran, a solution mixture comprising $2.38 \times 10^{-4}$ mol of α-methylstyrene and 5 ml of tetrahydrofuran, and 0.119 mmol of potassium naphthalide were, respectively, freezed, degassed and sealed in.

Namely, into the reaction flask maintained at $10^{-6}$ mmHg for 5 hours for degassing and cooled to −78° C., potassium naphthalide cooled to −78° C. and the solution mixture comprising α-methylstyrene and tetrahydrofuran were introduced by breaking the seals of the respective ampoules. (Oligo-α-methylstyryl potassium was obtained.)

Then, into the reaction flask, the tetrahydrofuran solution of 2-triisopropoxysilyl-1,3-butadiene was likewise introduced from the ampoule containing the tetrahydrofuran solution of 2-triisopropoxysilyl-1,3-butadiene. Then, the reaction was conducted at −78° C. for 0.5 hour, at 0° C. for 1.5 hours and further at 20° C. for 1 hour. The polymerization system was colored yellow brown specific to the living anion. This color disappeared immediately upon an addition of a small amount of water or methanol.

This living polymer was mixed with water at room temperature, then extracted with diethyl ether and dried over magnesium sulfate. Then, diethyl ether was removed to obtain poly(2-triisopropoxysilyl-1,3-butadiene) in a yield of 90%.

The glass transition temperature of this poly(2-triisopropoxysilyl-1,3-butadiene) was −36° C., and the polymer was soluble in organic solvents such as ethanol, pyridine, dioxane, tetrahydrofuran, benzene, chloroform and acetone.

Further, this poly(2-triisopropoxysilyl-1,3butadiene) was dissolved in tetrahydrofuran and subjected to gel permeation chromatography based on standard polystyrene, whereby the number-average molecular weight was 13,500. Whereas, the calculated value of the number-average molecular weight was 17,400.

The ratio of the weight-average molecular weight to the number-average molecular weight was 1.07.

The microstructure of this poly(2-triisopropoxysilyl-1,3-butadiene) was a 1,4-addition type and was composed of 100% cis-form.

EXAMPLE 11

The treatment was conducted in the same manner as in Example 10 except that ampoules wherein a solution mixture of $3.81 \times 10^{-3}$ mol of 2-triisopropoxysilyl-1,3-butadiene and 5 ml of tetrahydrofuran and a solution mixture of $1.48 \times 10^{-4}$ mol of lithium naphthalide and 5 ml of tetrahydrofuran were, respectively, freezed, degassed and sealed, were used and the reaction was conducted at $-78°$ C. for 1 hour, at $0°$ C. for 1 hour and at $20°$ C. for 1 hour.

The polymerization system was colored yellow specific to the living anion. However, the color disappeared immediately upon an addition of a small amount of water or methanol.

The yield of poly(2-triisopropoxysilyl-1,3-butadiene) was 88%.

The polymer was soluble in organic solvents such as ethanol, pyridine, dioxane, tetrahydrofuran, benzene, chloroform and acetone.

The number-average molecular weight was 15,500, and the calculated value was 13,300.

The ratio of the weight-average molecular weight to the number-average molecular weight was 1.15.

The microstructure of this poly(2-triisopropoxysilyl-1,3-butadiene) was a 1,4-addition type and composed of 100% cis-form.

EXAMPLE 12

The treatment was conducted in the same manner as in Example 10 except that ampoules in which a solution mixture of $4.41 \times 10^{-3}$ mol of 2-trimethoxysilyl-1,3-butadiene and 5 ml of tetrahydrofuran, a solution mixture of $2.48 \times 10^{-4}$ mol of $\alpha$-methylstyrene and 5 ml of tetrahydrofuran, and $1.24 \times 10^{-4}$ mol of potassium naphthalide were, respectively, freezed, degassed and sealed, were used.

The polymerization system was colored yellow brown specific to the living anion. However, the color disappeared immediately upon an addition of a small amount of water or methanol.

The yield of poly(2-trimethoxysilyl-1,3-butadiene) was 100%.

The glass transition temperature was $-36°$ C., and the polymer was soluble in organic solvents such as ethanol, pyridine, dioxane, tetrahydrofuran, benzene, chloroform and acetone.

The number-average molecular weight was 22,000, and the calculated value was 13,400.

The ratio of the weight-average molecular weight to the number average molecular weight was 1.25. The microstructure of this poly(2-trimethoxysilyl-1,3-butadiene) was a 1,4-addition type and was composed of 70% cis-form and 30% trans-form.

EXAMPLE 13

Anionic polymerization was conducted in the following manner by using an apparatus comprising a reaction flask connected to a highly vacuumed line and ampoules in which a solution mixture of $1.17 \times 10^{-2}$ mol of 2-trimethoxysilyl-1,3-butadiene and 5 ml of tetrahydrofuran, a solution mixture of $5.30 \times 10^{-4}$ mol of $\alpha$-methylstyrene and 5 ml of tetrahydrofuran, a solution mixture of $3.29 \times 10^{-2}$ mol of isoprene and 5 ml of tetrahydrofuran, and $1.19 \times 10^{-4}$ mol of potassium naphthalide were, respectively, freezed, degassed and sealed.

Namely, the reaction flask was maintained at $10^{-6}$ mmHg for 5 hours for degassing. The sealing of ampoules containing potassium naphthalide and the solution mixture of $\alpha$-methylstyrene and tetrahydrofuran was broken, and the contents were introduced into the reaction flask at room temperature. The color of the solution was red.

Then, after cooling the solution at $-78°$ C., the sealing of the ampoule containing isoprene and tetrahydrofuran was broken, and the system was maintained at $-78°$ C. for 3 hours. The color of the solution was brown.

Then, the sealing of the ampoule containing $1.17 \times 10^{-2}$ mol of 2-trimethoxysilyl-1,3-butadiene and 5 ml of tetrahydrofuran was broken, and the reaction was conducted for 14 hours from $0°$ C. to room temperature.

The polymerization system was colored yellow brown specific to the living anion. However, this color disappeared immediately upon an addition of a small amount of water or methanol.

Then, this living block copolymer was treated in the same manner as in Example 10 to obtain a block copolymer. Yield was 73%.

The block copolymer thus obtained was as follows:

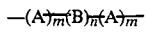

wherein A represents 2-trimethoxysilyl-1,3-butadiene and B represents isoprene

Measured values: $2m = 195$, $n = 634$
Calculated values: $2m = 197$, $n = 553$

This copolymer undergoes cross linking to form —Si—O—Si linkages in an acidic atmosphere and forms a crosslinked polymer which is insoluble and scarcely swelled in benzene or tetrahydrofuran.

We claim:

1. A 1,4-addition polymer of a silane 1,3-butadiene, having units of the formula:

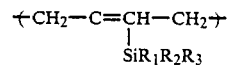

wherein each of $R_1$, $R_2$, and $R_3$ is lower alkyl or lower alkoxy, provided that $R_1$, $R_2$ and $R_3$ are not lower alkyl at the same time, wherein at least 70% of the units are of cis-form.

2. The polymer according to claim 1, which is a copolymer with unsaturated cononomers.

3. The polymer according to claim 1, which is a living polymer.

4. The polymer according to claim 3, wherein the living polymer has a ratio of the weight-average molecular weight to the number-average molecular weight of from 1.07 to 1.25.

5. The polymer according to claim 1, which is a living copolymer with an unsaturated comonomer.

6. The polymer according to claim 1, which has a glass transition temperature of from $-43°$ C. to $-36°$ C.

* * * * *